(12) United States Patent
Hillier (10) Patent No.: US 12,056,680 B2
(45) Date of Patent: Aug. 6, 2024

(54) SYSTEM PROVIDING RELEVANT SERVICES TO TRANSIENT DEVICES IN WIRELESS NETWORKS AND METHODS THEREOF

(71) Applicant: Mitel Networks Corporation, Kanata (CA)

(72) Inventor: Peter Matthew Hillier, Ottawa (CA)

(73) Assignee: MITELNETWORKS CORP., Kanata (CA)

( * ) Notice: Subject to any disclaimer, the term of this patent is extended or adjusted under 35 U.S.C. 154(b) by 355 days.

(21) Appl. No.: 17/472,175

(22) Filed: Sep. 10, 2021

(65) Prior Publication Data

US 2021/0406867 A1 Dec. 30, 2021

Related U.S. Application Data

(62) Division of application No. 15/990,399, filed on May 25, 2018, now abandoned, which is a division of (Continued)

(51) Int. Cl.
*G06Q 20/32* (2012.01)
*H04M 1/2757* (2020.01)
(Continued)

(52) U.S. Cl.
CPC ...... *G06Q 20/3224* (2013.01); *H04M 1/2757* (2020.01); *H04M 1/72457* (2021.01); *H04M 3/42348* (2013.01); *H04W 4/029* (2018.02); *H04W 12/0431* (2021.01); *H04W 12/082* (2021.01); *G06Q 2220/12* (2013.01); *H04L 63/107* (2013.01); *H04M 3/38* (2013.01);
(Continued)

(58) Field of Classification Search
None
See application file for complete search history.

(56) References Cited

U.S. PATENT DOCUMENTS 6,400,946 B1 6/2002 Vazvan et al.
7,577,996 B1 8/2009 Merchant et al.
(Continued)

FOREIGN PATENT DOCUMENTS

EP 2136527 A1 12/2009
WO WO 2009/025707 A1 2/2009
(Continued)

*Primary Examiner* — Frantz Bataille (57) ABSTRACT

Generally described, the present disclosure relates to communications and more particularly, to a system providing relevant services to transient devices in wireless networks and methods thereof. In one illustrative embodiment, a Unified Communications and Collaboration (UCC) client on a device can be synchronized with a network so that the device can appear as a local entity. The UCC client can facilitate exchange of data to ease the integration of the device into the local environment. After being synchronized, the UCC client can seek out available assistance from the local network and provide it to the user. Typically, the data retrieved from the local network pertains to the current location. The local network can be used to provide wireless service to mobile devices in order to remove them from their carrier network, including providing a local breakout via a Private Branch Exchange (PBX).

19 Claims, 8 Drawing Sheets

Related U.S. Application Data application No. 13/134,916, filed on Jun. 20, 2011, now Pat. No. 9,984,363.

(51) Int. Cl.
*H04M 1/72457* (2021.01)
*H04M 3/42* (2006.01)
*H04W 4/029* (2018.01)
*H04W 12/0431* (2021.01)
*H04W 12/082* (2021.01)
*H04L 9/40* (2022.01)
*H04M 3/38* (2006.01)
*H04W 84/12* (2009.01)

(52) U.S. Cl.
CPC ............ *H04M 2203/1058* (2013.01); *H04M 2203/2094* (2013.01); *H04M 2207/18* (2013.01); *H04W 84/12* (2013.01)

(56) References Cited

U.S. PATENT DOCUMENTS

| | | |
|---|---|---|
| 8,972,589 B2 | 3/2015 | Roese et al. |
| 2002/0077060 A1 | 6/2002 | Lehikoinen et al. |
| 2003/0017826 A1 | 1/2003 | Fishman et al. |
| 2004/0185874 A1 | 9/2004 | Kim et al. |
| 2006/0089152 A1 | 4/2006 | Mahonen |
| 2006/0223556 A1 | 10/2006 | Xu et al. |
| 2006/0239736 A1 | 10/2006 | Kitada |
| 2007/0027921 A1* | 2/2007 | Alvarado .............. H04L 63/102 |
| 2008/0227430 A1 | 9/2008 | Polk |
| 2009/0110177 A1 | 4/2009 | Sivakumar |
| 2009/0325606 A1 | 12/2009 | Farris |
| 2010/0061247 A1* | 3/2010 | He ....................... H04L 12/189 |
| | | 370/312 |
| 2010/0281223 A1 | 11/2010 | Wolfe et al. |
| 2011/0026704 A1 | 2/2011 | Connelly et al. |
| 2011/0153426 A1 | 6/2011 | Reddy et al. |
| 2011/0275364 A1 | 11/2011 | Austin et al. |
| 2011/0276895 A1 | 11/2011 | van der Flier et al. |
| 2012/0058775 A1 | 3/2012 | Dupray et al. |

FOREIGN PATENT DOCUMENTS

| | | |
|---|---|---|
| WO | WO 2010/141656 A1 | 12/2010 |
| WO | WO 2011/030533 A1 | 3/2011 |

\* cited by examiner

SYSTEM PROVIDING RELEVANT SERVICES TO TRANSIENT DEVICES IN WIRELESS NETWORKS AND METHODS THEREOF

CROSS-REFERENCE TO RELATED APPLICATIONS

This application is a divisional of and claims priority to U.S. patent application Ser. No. 15/990,399 filed May 25, 2018 titled "SYSTEM PROVIDING RELEVANT SERVICES TO TRANSIENT DEVICES IN WIRELESS NETWORKS AND METHODS THEREOF" which is a divisional of and claims priority to U.S. patent application Ser. No. 13/134,916 filed Jun. 20, 2011 titled "SYSTEM PROVIDING RELEVANT SERVICES TO TRANSIENT DEVICES IN WIRELESS NETWORKS AND METHODS THEREOF" (Now U.S. Pat. No. 9,984,363), the disclosures of which are hereby incorporated herein by reference in their entirety.

TECHNICAL FIELD

This disclosure generally related to communications, and more particularly, to a client application operating on a device synchronized with a network to receive local services or data.

BACKGROUND

Wireless networks offer many advantages over traditional wireline connections. Wireless networks can be found at almost any location, for example, in large cities, businesses or even homes. At any given moment, a mobile or wireless device can be in range of a network that can offer local services to the user. Allowing open and free access to this network, however, is not always desirable. One disadvantage of current systems is allowing access to these services to some while preventing others. Based on the user, it is also difficult to determine which services to provide. To further explain these disadvantages, a number of examples are provided below.

In a first example, a consumer enters into their local building supply store to find an item. All the floor personnel are busy serving other consumers. The consumer needs to find out which isle the item is in and further, to know in advance if it is in stock. If the consumer can get the internal customer service number, a store map or access to the store inventory, they can quickly address the issue. Access to a WiFi™, Picocell, Digital Enhanced Cordless Telecommunication (DECT) or fixed network is handled by an administrator. A unique device attribute, such as a Media Access Control (MAC) address or an International Mobile Equipment Identity (IMEC) is required to be programmed before network access is given. Alternatively, a username and password can be used. As the device attributes need to be setup in advance, this poses a significant disadvantage. When the administrator modifies the network access credentials, which happens frequently, attempting to connect to the network fails.

The consumer could use their mobile devices' carrier Internet connection to access the store website to obtain customer service information. Alternately, or if the consumer has no data contract with the carrier, they can also access "411" or other voice directory services to obtain data to call the store for assistance. Often this is front ended by an Automatic Call Distributor (ACD) to direct calls to the proper area of service. This number can be permanently stored in the contacts, but persistent storage of rarely used numbers has its own problems. Repeatedly using "411" or other means of obtaining contacts can be costly in terms of carrier charges for directory assistance or internet access. Calls can incur toll charges despite being answered locally within the Private Branch Exchange (PBX) infrastructure of the building, often by an individual only meters away.

Current mobile devices do not provide a means for data, such as a phone number, obtained through internet browsing to be automatically added to the consumer's carrier based mobile device. Some 411 systems can send an SMS containing the requested number, but it is often the task of the mobile owner to add the obtained contact information manually using the phone interface or a PC based application. Due to limited screen real estate, if the number cannot be remembered during entry, the user must access multiple screens back and forth to complete the task. These methods (carrier internet or 411) can incur charges for phone usage.

In a second example, an employee works for a multi-national corporation and travels around the world visiting corporate offices. The employee's company uses a Fixed Mobile Convergence (FMC) solution that guarantees that they can always be reached, but their calls are always routed through their main office in Ottawa, Canada. This solution includes a softphone client using WiFi™, but the WiFi™ network credentials are independently managed by each office and change frequently due to security reasons. Once the employee sets this up, their roaming charges are reduced by using the internal network, but from the enterprise network perspective, the employee's location is assumed to be Ottawa. Any calls local to the user in Germany are actually charged as long distance from Ottawa, incurring costs to the company. For example, the employee has a speed call for a taxi, but it is for Ottawa. The company cafeteria number is also for Canada, as is the corporate speech activated employee directory number. To resolve these issues the employee needs to know data relevant to the current office they are in. Furthermore, local calls should originate from the local Public Switched Telephone Network (PSTN) breakout associated with their location, for example, Germany, and not from the location associated with their business extension, for example, Ottawa.

In a third example, a frequent traveler is a member of an elite consumer rewards program with a hotel chain. One hotel within the chain offers the traveler a complimentary Voice over Internet Protocol (VoIP) client for their mobile phone during their stay in the hotel. This phone is twinned with their room phone and allows them to make and receive calls. At each hotel the traveler visits, the client must be reconfigured to the local network. The traveler wants the hotel chain to provide a client that operates in all of its hotels consistently, and has the same services that can easily be accessed without knowing the various numbers for each location. Often on guest networks, the traveler requests for access to the network from the front desk. This requires an identification number to be provided which is entered from the device. This number, however, changes frequently for security reasons causing a number of issues.

In each of these examples, the devices are considered transient to the network such that they are not always connected, or infrequently connected. A need exists for a device to obtain data and access to a local area network while removing those issues described above. Once access is achieved, the device should be able to receive a list of services to determine if possible information exists to assist them. These, as well as other related advantages, will be described in the present disclosure.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DETAILED DESCRIPTION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The data structures and code described in this detailed disclosure are typically stored on a non-transitory computer-readable storage medium, which can be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed disclosure section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Generally described, the present disclosure relates to communications and more particularly, to a system providing relevant services to transient devices in wireless networks and methods thereof. In one illustrative embodiment, a Unified Communications and Collaboration (UCC) client on a device can be synchronized with a network so that the device can appear as a local entity. The UCC client can facilitate exchange of data to ease the integration of the device into the local environment. After being synchronized, the UCC client can seek out available assistance from the local network and provide it to the user. Typically, the data retrieved from the local network pertains to the current location. The local network can be used to provide wireless service to mobile devices in order to remove them from their carrier network, including providing a local breakout via a Private Branch Exchange (PBX).

Numerous advantages can be offered by the illustrative embodiment described above. The UCC client can provide a single network sign-on to access local network data. Forced network presence can also be provided when the mobile device having the UCC client is within range, implying the device must reside in the scope of the local network, that is be "present", in order to access network services. In addition, almost any type of data specific to the user's location can be provided without carrier charges. A local breakout can provide the UCC client with the ability to make or receive calls without receiving additional carrier charges. Automatic cleanup can also be provided within the UCC client, such as when it leaves the scope of the local network. These as well as many additional advantages of the present disclosure will become apparent to those skilled in the relevant art as provided for in the following description.

Figure 3:
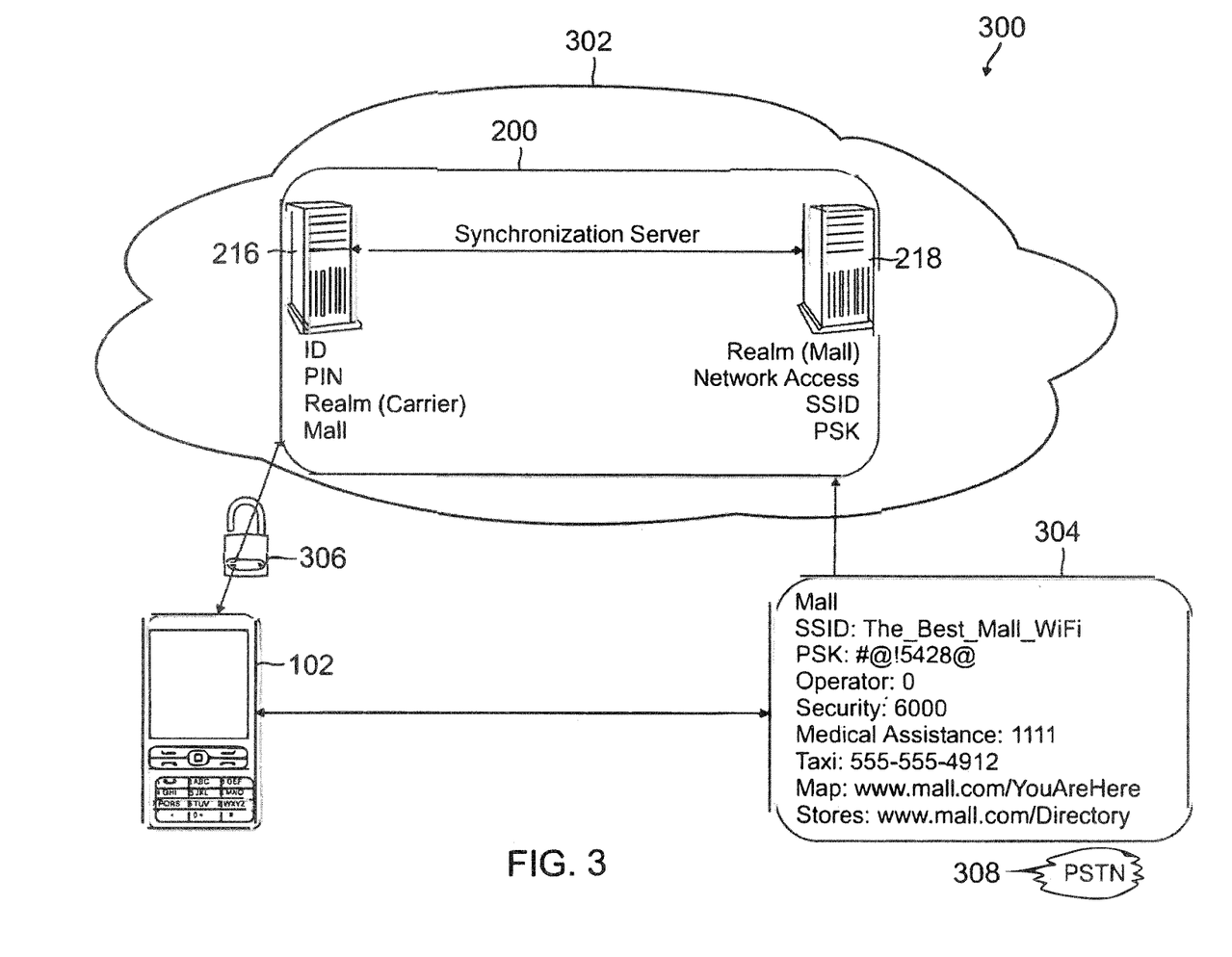
FIG. 3 is an exemplary system for synchronizing a device in accordance with one or more aspects of the present disclosure.
Figure 4:
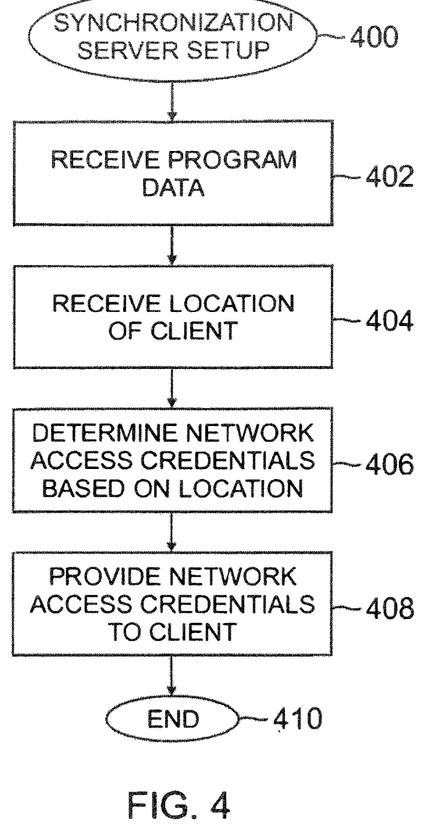
FIG. 4 is a flow chart depicting illustrative processes for setting up a synchronization server in accordance with one or more aspects of the present disclosure.
Figure 5:
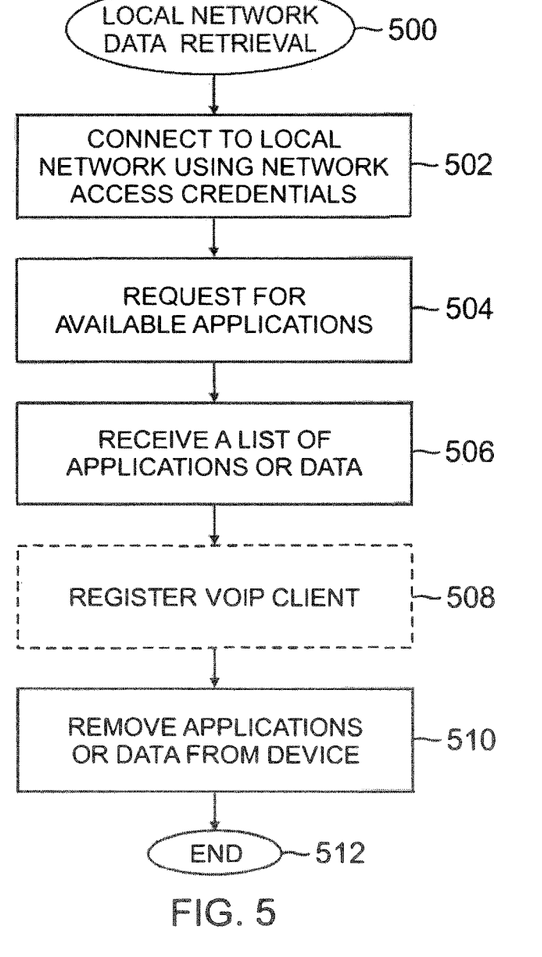
FIG. 5 is a flow chart depicting illustrative processes for retrieving local network data from the synchronization server in accordance with one or more aspects of the present disclosure.
Figure 6:
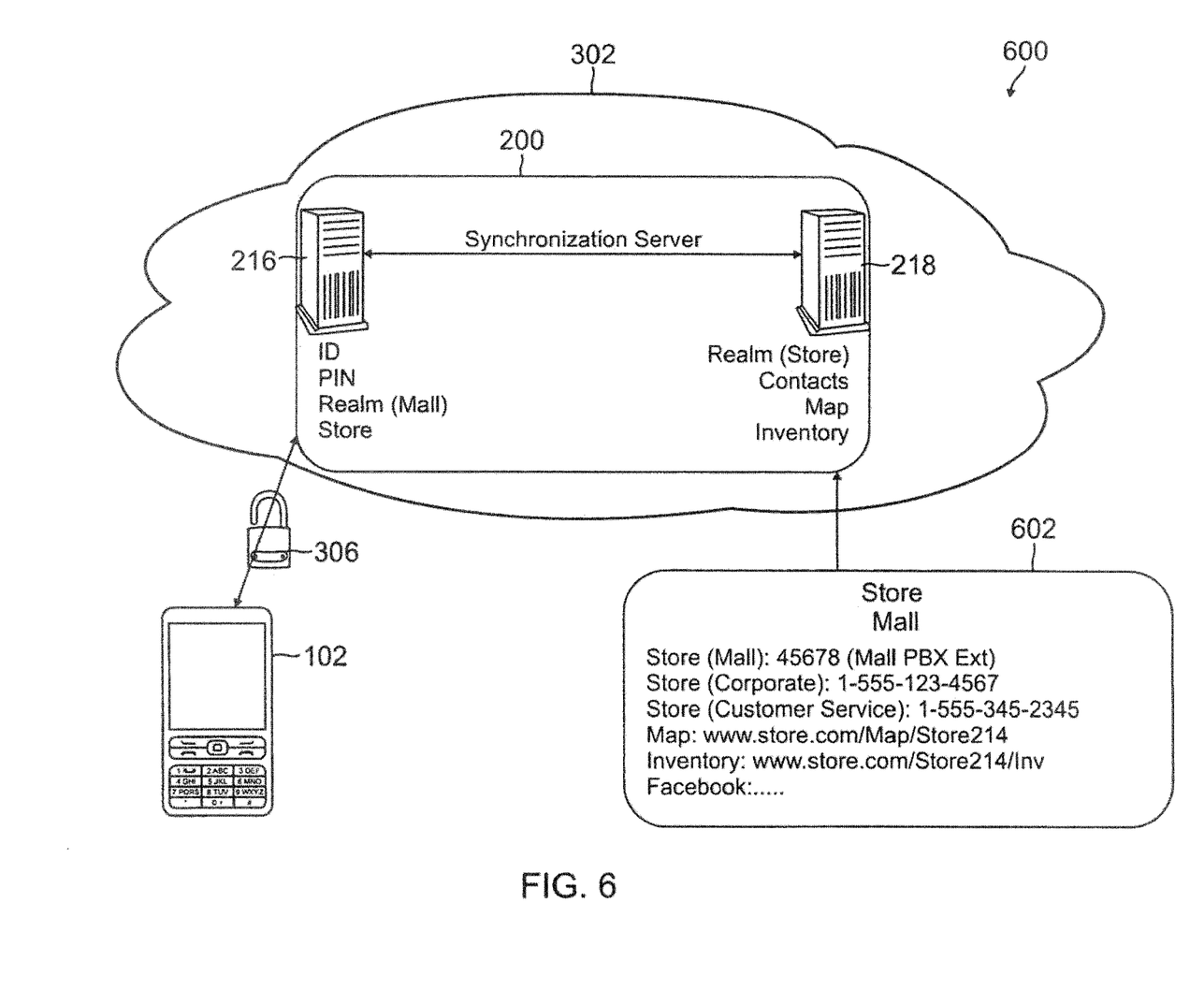
FIG. 6 is an exemplary system for distributing localized data in accordance with one or more aspects of the present disclosure.
Figure 7:
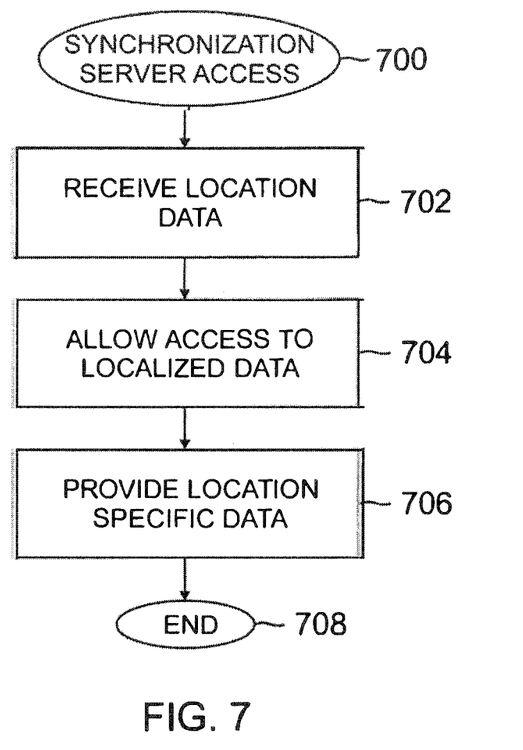
FIG. 7 is a flow chart depicting illustrative processes for accessing a synchronization server in accordance with one or more aspects of the present disclosure.

An exemplary transient device for receiving relevant services will be described in FIG. 1, while a synchronization server for providing those relevant services is provided in FIG. 2. FIGS. 3 through 5 will provide exemplary procedures for establishing a connection between the UCC client and the server to retrieve and provide local services. In FIGS. 6 and 7, illustrative procedures are described for providing services to the UCC client at a more specific location. A device localized to various local networks having a common interface is described in FIGS. 8 and 9.

The term transient device can refer to devices that are mobile or wireless and are able to be moved between numerous locations, often freely. A transient device can include a cell phone, personal digital assistant (PDA), smart phone, web tablet, laptop computer, pocket PC, portable television set, mobile IP device or the like. Transient device can also be referred to as a mobile or wireless phone within the present disclosure. The term realm can refer to a region covered by a synchronization server defining a local network. The UCC client can also be part of Mitel®'s Unified Communicator Advanced (UCA) system.

The technology described herein can be implemented as logical operations and/or modules. The logical operations can be implemented as a sequence of processor-implemented executed steps and as interconnected machine or circuit modules. Likewise, the descriptions of various component modules can be provided in terms of operations executed or effected by the modules. The resulting implementation is a matter of choice, dependent on the performance requirements of the underlying system implementing the described technology. Accordingly, the logical operations making up the embodiment of the technology described herein are referred to variously as operations, steps, objects, or modules. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada, or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

Figure 1:
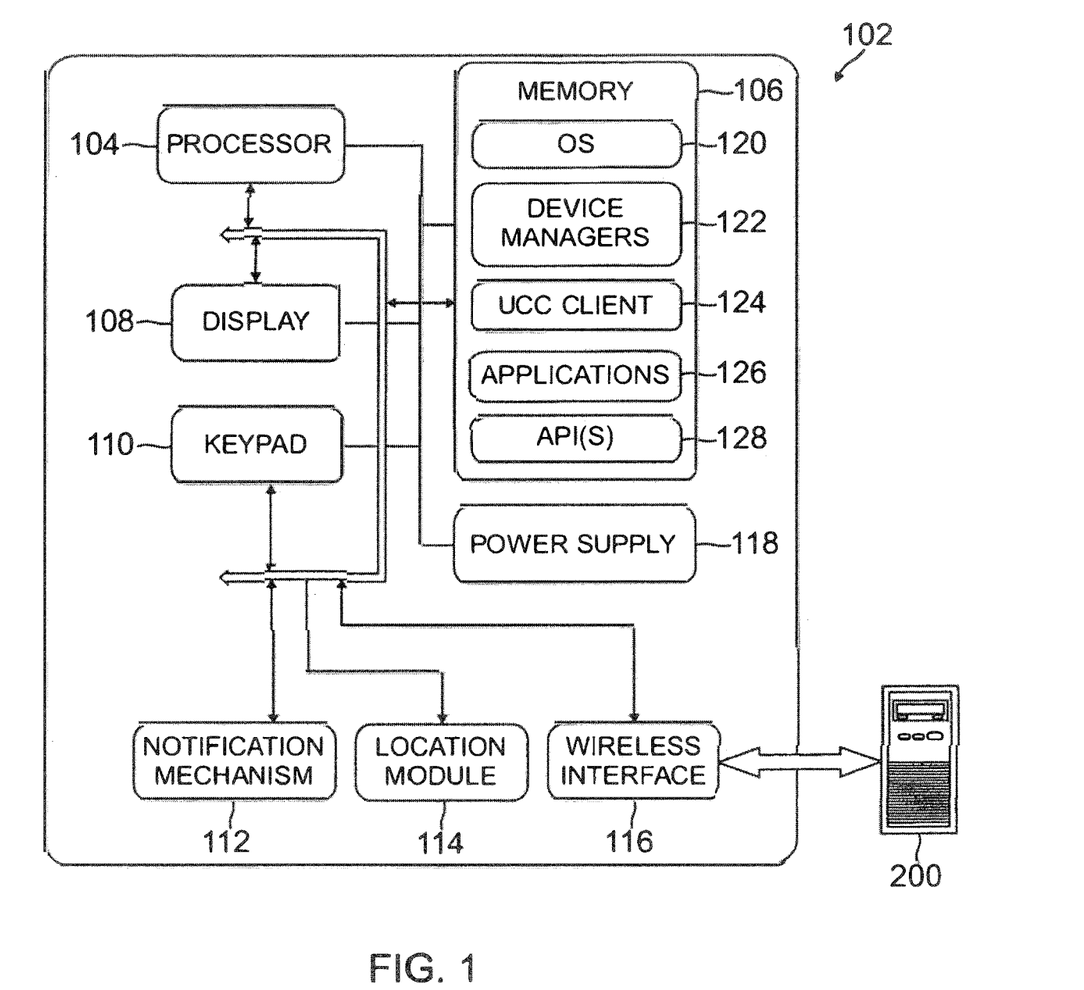
FIG. 1 is a block diagram representing illustrative hardware and software components of a typical mobile device for receiving local services in accordance with one or more aspects of the present disclosure.

Turning now to FIG. 1, a block diagram representing illustrative hardware and software components of a typical mobile device 102 for receiving local services in accordance with one aspect of the present disclosure is provided. The mobile device 102 can have a processor 104 for implementing logic, a memory 106, a display 108 and a keypad 110. The display 108 of the mobile device 102 can be a liquid crystal display (LCD), or any other type of display commonly used in mobile devices 102. The display 108 can be touch-sensitive, and can act as an input device. The keypad 110 can be a push button numeric dialing pad (such as on a typical telephone), a multi-key keyboard (such as a conventional keyboard), or any other device for inputting textual data.

The memory 106 generally includes both volatile memory (e.g., RAM) and non-volatile memory (e.g., ROM, Flash Memory, or the like). The non-volatile portion of the memory 106 can be used to store persistent data which is typically not lost when the mobile device 102 is powered down. The mobile device 102 can include an operating system (OS) 120, such as Windows CE™ or Windows Mobile™ available from Microsoft Corporation, Android™ from Google, or other OS. The OS can reside in the memory 106 and be executed on the processor 104. The memory 106 can also include one or more device managers 122 for interacting with one or more I/O devices. The device managers 122 can be software installed on the mobile device 102. A device manager 122 can correspond to each I/O device.

A UCC client 124 can be loaded into memory 106 and run on or in association with the operating system 120. The UCC client 124 can facilitate the exchange of data between the synchronization server 200 and the mobile device 102. The UCC client 124 can reside on the mobile device 102 and can be activated as a background task. The UCC client 124 can be used in combination with applications 126 present within or outside of memory 106. For example, the client 124 can add and remove contacts from the user phone book, download maps, stream video, display advertisements or flyers, update contact services and more. These abilities are configurable by the end user for security and content limitation reasons. The UCC client 124 can connect to the synchronization server 200 to obtain data.

When the mobile device 102 enters within a realm defined by the synchronization server 200, the client 124 can interact with the server 200 to obtain access and to act on data provided by the server 200. For example, if phone contacts are provided within the realm of the server 200, they are populated into the phone contact list. The client 124 is able to operate a number of features of the phone 102 either through native integration or via a thick client. Web addresses can be added to the web browser favorites. Maps can be added to the web browser and then launched either by the user clicking on a link or automatically. Contacts can be added to the phone 102 or associated applications 126. If a WiFi™ network is available, the WiFi™ client can be activated, and an alternate Voice over Internet Protocol (VoIP) phone registered.

The UCC client 124 described above can be repurposed for numerous uses, including but not limited to a single sign-on solution for multiple/distributed networks. A UCC/Fixed Mobile Convergence (FMC) solution can be used for corporations or the like with multi-site buildings across the city, country, or world. Hospitality solutions for individual hotels or hotel chains that wish to provide a uniform service to travelers who frequent many of the chains hotels can also be integrated for the UCC client 124. Through the client 124, prices, availability, reservations, airlines, restaurants, taxis, and other content can be supplied. In the health care field, hospitals can provide mapping services, patient locations (room number or more advanced), wait times for services (clinics), etc. In retail, malls and stores can provide product inventory, location, specials, comparisons, etc. For resorts and cruises, mapping services, guest locations (room numbers) and guest services can be provided. In the legal field, a list of lawyers accepting service, specialties, location (office number/floor), etc. can be provided by the client 124. Known to those skilled in the relevant art, the UCC client 124 within a local network can provide a number of different services.

The services provided by the server 200 can support the notion of "common" or "public" numbers, and "private" numbers. Public numbers are available for use to UCC clients 124, whereas private numbers are not shared. A range of numbers can also be determined as "public". For example, if audio/video conferencing services are available, the access numbers could be public to allow transient network users access to these services (such as hotel conference rooms). The concept of private or public can be applied to any data or service, and is not restricted to numbers only.

The applications 126 operating within memory 106 can include a phone book, contacts, etc. Any number of applications 126 can exist and be used with the UCC client 124. In one embodiment, the applications 126 are provided by the server 200. Alternatively, data is provided to the applications 126 operating on the device 102. The memory 106 can also include a collection of one or more APIs 128 for facilitating wireless communication between the mobile device 102 and one or more remote I/O devices. The APIs 128 can be invoked by the UCC client 124 or applications 126 to recognize and control the one or more remote I/O devices. In this manner, the mobile device 102 is able to take advantage of services or functionalities of the one or more remote I/O devices.

The mobile device 102 can also include a power supply 118, which can be implemented as one or more batteries, fuel cells, or other sources of electrical power. The mobile device 102 can include one or more audio, visual, and/or vibratory notification mechanisms 112. A location module 114 can be provided as a standalone component or be a part of memory 106. The location module 114 can be used to retrieve the location of the mobile device 102 through a number of different techniques that include, but are not limited, to Global Positioning System (GPS) coordinates, cellular triangulation or via some input/pick list mechanism. The mobile device 102 can also include a wireless module 116, such as a WiFi™ module that facilitates wireless connectivity between the mobile device 102 and the server 200.

Figure 2:
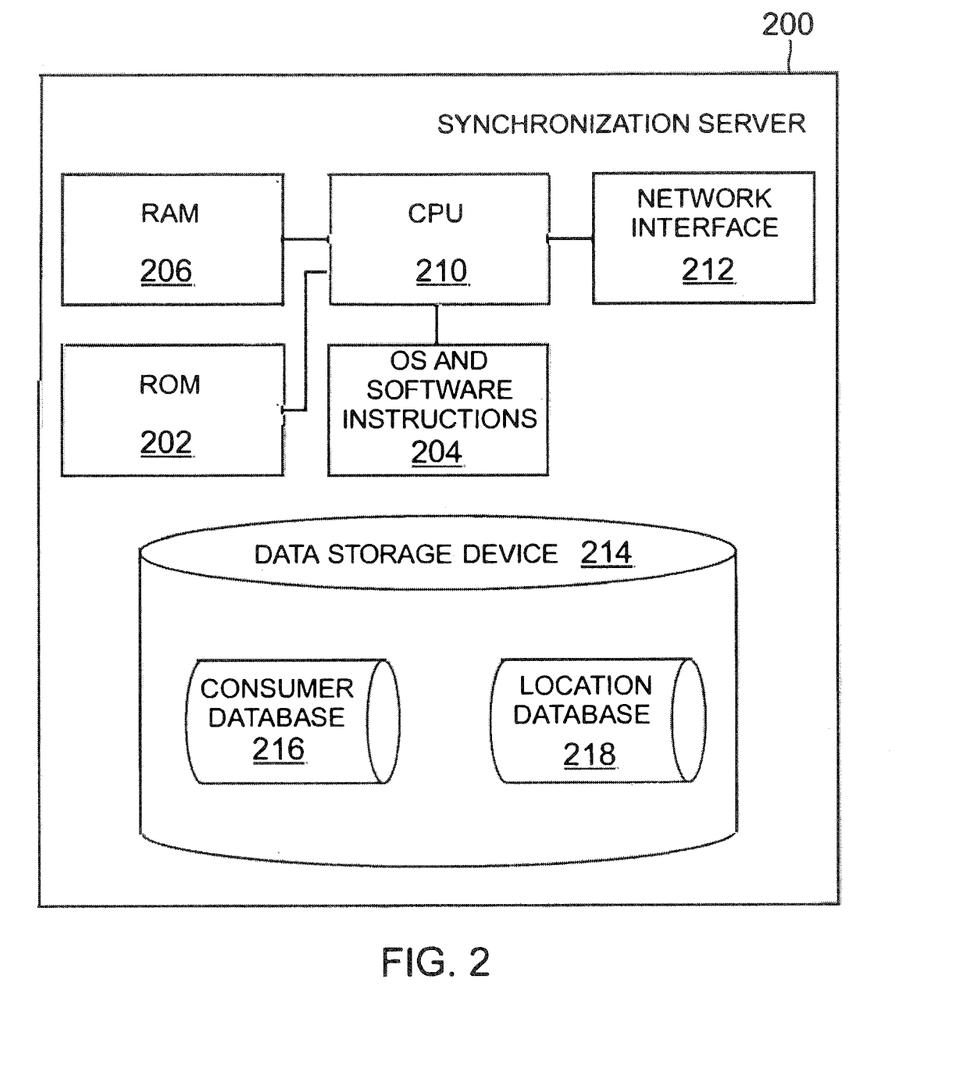
FIG. 2 is a block diagram representing illustrative hardware and software for a synchronization server communicating with the mobile device to provide local services in accordance with one or more aspects of the present disclosure.

FIG. 2 is a block diagram representing illustrative hardware and software of a synchronization server 200 in accordance with one or more aspects of the present disclosure. The server 200 can include ROM 202, operating system and software instructions 204, RAM 206, central processor unit (CPU) 210, network interface 212 and data storage device 214. A conventional personal computer or computer workstation with sufficient memory and processing capabilities can be used as the server 200. In one embodiment, the synchronization server 200 can take the form of another mobile device or the like. This device can act as the server 200 and publish information for consumption by the UCC client 124 operating on the mobile device 102 receiving the information. As such, the synchronization server 200 does not need each and every component described herein and can take on many different forms. For purposes of illustration, a smartphone or mobile device can offer WiFi™ to surrounding mobile devices 102 and their clients 124. Alternatively, multiple interconnected servers can also act as the server. The synchronization server 200 can have two main tasks. The first task is typically to validate administrators and allow content to be published. The second is to validate clients and provide content to them. Other tasks known to those skilled in the relevant art will be appreciated from the description provided below.

The server 200 can be able to handle high volumes of transactions and large amounts of queries for communication and data processing. RAM 206 and ROM 202 are used to support the program codes that are operated by the CPU 210. The memory can be in a form of a hard disk, CD ROM, or equivalent storage medium. The CPU 210 can support the authentications such as communications from external data servers, as well as allowing for anonymous transactions and general data encryption. The data storage device 214 can include hard disk magnetic or optical storage units, as well as CD ROM, CD RW or DVD ROM and flash memory such as compact flash and secure digital cards.

The data storage device 214 contains databases used in the processing of transactions. These databases can include a consumer database 216 and a location database 218. The consumer database 216 can track information about a number of devices 102 and their users that are connected with the server 200. The consumer database 216 can maintain identifications (IDs) for each of these connected devices 102. In one embodiment, IP addresses of the devices 102 or usernames can be associated with each device 102 and stored in the consumer database 216. A Personal Identification Number (PIN) can also be stored within the database 216 for each connected device 102 and be associated with the IP address or username.

Data about a consumer's realm can also be maintained within the database 216. Each synchronization server 200 can be associated with a network realm for which it provides services. Devices 102 entering within this realm can add data and services that can be accessed by others in the realm, or create their own realm with specific content and services. Each realm can be configured by administrators who are responsible for providing and updating content and services for the realm. Usernames, passwords or certificates can be used to authenticate administrators. Each realm can be configured with clients, or be left open. The usernames, passwords or certificate exchanges can be used to limit or protect access to some or all of the content and services used by clients 124, which will become more apparent from the description provided below.

Realm data can also be stored within the location database 218. The location database 218 can also store access credentials. The access credentials can include, but are not limited to, a Service Set Identifier (SSID) and a Pre-Shared Key (PSK). Continuing with FIG. 2, the server 200 can include a network interface 212 in order to communicate with other components. Conventional internal or external modems can serve as the network interface 212. A cable or DSL modem can be used as a network interface 212. The network interface 212 can support modems at a range of baud rate from 2400 and upwards. The interface 212 can be at least one of WiFi™, Bluetooth™, etc.

While the above embodiment describes a single computer system acting as the server 200, the functionality can be distributed over multiple computing systems. The databases 216 and 218 can also be distributed over a cloud computing environment. In one embodiment, the server 200 is configured in a distributed architecture, wherein the databases and processors are housed in separate units or locations. Some servers perform the primary processing functions and contain at a minimum RAM, ROM, and a general processor. Each of these servers can be attached to a WAN hub which serves as the primary communication link with the other servers and interface devices. The WAN hub can have minimal processing capability itself, serving primarily as a communications router. Those skilled in the art will appreciate that an almost unlimited number of controllers can be supported. This arrangement yields a more dynamic and flexible system, less prone to catastrophic hardware failures affecting the entire system.

Referring now to FIG. 3, an exemplary system 300 for synchronizing a device 102 in accordance with one or more aspects of the present disclosure is provided. The system 300 can include the synchronization server 200 coupled to a number of different components including, but not limited to, the mobile device 102. To prevent access to data on the server 200, network credentials are typically required from the transient device 102, as indicated by the lock 306 placed around communications going to and received from the server 200. While several components have been described, fewer or more components can be placed within the system 300 which are known to those skilled in the relevant art.

A system administrator terminal can be connected to the synchronization server 200. The system administrator can provide program data 304 to the server 200. The administrator terminal can communicate with the server 200 through a trusted or secure connection. Transient devices 102 can also provide program data 304. A number of advantages can be provided when a user of a device 102 entering into the realm serviced by the server 200 provides program data 304. For example, a spill within a grocery store can be communicated to management through the device 102.

The transient device 102 can communicate with the consumer database 216 of the server 200 while the administrator terminal can communicate with the location database 218. The synchronization server 200 can broadcast services from within its wireless realm 302. When the UCC client 124 of the transient device 102 is within range of the wireless network, it can register and the client 124 and server 200 can exchange data. The realm 302 can be provided in a WiFi™, Digital Enhanced Cordless Telecommunications (DECT), Picocell, Femto or cellular network.

To illustrate features of the present disclosure, FIG. 3 depicts a synchronization server 200 placed within a mall that provides local services. The data 304 provided by the administrator of the mall can include a SSID and PSK as access credentials. The SSID can be "The_Best_Mall_WiFi" while the PSK can be "#@!5428@" as shown. These credentials can be stored directly in the location database 218 of the server 200. The access credentials can be used by the client 124 on the device 102 to access the synchronization server 200 and thereby removing the lock 306 associated with the data on the server 200.

In one embodiment, the credentials can be used to separate varying degrees of access to data 304 within the server 200. For example, a transient device 102 such as a smartphone having voice capabilities would be given different access to the program data 304 than a cell phone having fewer capabilities. The access credentials can also be used to provide varying levels of permissions and data to specific consumers. For example, Gold or Platinum members can be given access to more data 304 than those who have no preexisting relationship.

The program data 304, in accordance with the illustration, can include dial in numbers that are specific to that particular local network. For example, an operator can be called when a "O" is pressed on the transient device 102. Security can be called when "6000" is entered, medical assistance can be dialed when "1111" is entered and a taxi can be called when "555-555-4912" is entered. These contacts can be automatically placed within the contact list of the device 102. Uniform Resource Links (URLs) can be provided to the device 102 that have a map of the mall or stores therein. These links can be automatically placed into a browser operating on the device 102 when requested.

In addition to phone contacts or layouts, many valuable services can be offered, including localized store maps and location detection within the store, local apps for the store, streaming video for advertising and flyers, presence and recent store guest information, which friends shopped there, what they bought, most popular items and other social services. Almost any type of local data 304 can be provided to the device 102 when properly synchronized with the server 200. Data specific to the consumer can be stored in the consumer database 216.

As shown in FIG. 3, a local Public Switched Telephone Network (PSTN) breakout 308 can be provided. The PSTN breakout 308 can be used to route communications such that calls can be received and made by a user of the device 102 locally through the server 200, typically through the use of a PBX within the realm 302. Access to the PSTN breakout 308 can be established through the program data 304 provided by the administrator. This access data can then be stored in the location database 218 on the synchronization server 200. When the UCC client 124 on the transient device 102 leaves the realm 302 of the network operated by the server 200, the services can be removed. Previously existing contacts or other data can be restored.

FIG. 4 is a flow chart depicting illustrative processes for setting up. a synchronization server 200 in accordance with one or more aspects of the present disclosure. The processes can begin at block 400. At block 402, program data 304 can be received. The program data 304 typically comes from an administrator operating on a separate terminal or in the alternative, from users operating devices 102 themselves. For the transient device 102 to access the provided program data 304, the UCC client 124 obtains the proper access credentials. To obtain these, the user activates their client 124. The graphical user interface supported by the device 102 can display a "Sync" option. After enabling this, the UCC client 124 can activate the location module 114 on the device 102 to obtain the current location of the device 102. The location can be identified using GPS coordinates, cellular triangulation, or via some input or pick list mechanism. Numerous types of input methods for defining the user's location can be considered.

At block 404, the location data of the device 102 is received by the consumer database 216 of the server 200, which can be saved. An ID and PIN of the device 102 can then be stored on the consumer database 216. This information can be used to store data about the particular device 102 for the entire duration that the device 102 is within the realm 302. In one embodiment, the client 124 can be authenticated using the ID and PIN if the server is protected or is operated as a paid service. At block 406, network access credentials are determined based on the location of the device 102 by the server 200. When the consumer database 216 receives a request for the credentials, the consumer database 216 can consult with the location database 218, which maintains the SSID and PSK to access the server 200.

After retrieving the proper credentials from the location database 218, they can be provided to the UCC client 124 by the server 200 from the consumer database 216 at block 408. A log of the access credentials provided to the client 124 can be maintained within the consumer database 216. This log can be used to determine who had access to the data 304 maintained within the location database 218. The UCC client 124 can enable WiFi™ or the like and reconnect to the internal network using the credentials. The processes for synchronization service setup can end at block 410.

The system 300 can provide a single network sign on. From the synchronization server 200, the network administrator can modify the network access parameters at any time. When the UCC client 124 on the device 102 performs a location "Sync" the network parameters are obtained from the synchronization server 200, thus insuring they are always up to date. The connection between the network administrator and synchronization server 200 is trusted, as is the connection between the UCC client 124 and server 200. Through the secure connections network credentials remain protected.

The synchronization server 200 can employ a strategic access model that provides a forced network presence. After selecting "Sync" from the UCC application 124, the device 102 can be placed onto the localized network, if applicable. As will be shown below, services can then be obtained from within that realm 302. This provides access control and requires the user to be present within the network provided at the location in order to obtain location specific data 304. This is an optional feature but one which can be used to enforce local presence for security and marketing reasons.

Referring to FIG. 5, a flow chart depicting illustrative processes for retrieving local network data 304 in accordance with one or more aspects of the present disclosure is provided. The processes can begin at block 500. At block 502, the client 124 can reconnect to the internal synchronization server instance and continue. Through the network credentials previously received, the client 124 can automatically connect with the local network operated by the server 200. At block 504, the user of the device 102 can request for available applications 126. Alternatively, the client 124 can request for data 304 to be used with applications 126 already on the device 102.

At block 506, the device 102 can receive a list of applications 126 or data 304 for operation on the device 102. For example, data 304 regarding store hours and location can be sent to an application 126 residing on the device 102. Alternatively, a "canned" application 126 operating on top of the device 102 can be used to integrate it into the system 300. Continuing with the mall illustration provided in FIG. 3, the mall can have re-skinned the UCC/FMC solution to provide an application 126 instead of requiring the carrier services integration. The user can simply select the mall application from their application list and have access to some local numbers, such as security, taxi and mall operator numbers. In one embodiment, the mall does not provide an internal mapping service such that it does not work with GPS, WiFi™ or other method. The synchronization server 200 simply offers a website for a static mall map as well as a web based store directory that provides store lookup, location, and PBX extension. Depending on the technology deployed by the mall, this could easily be expanded to offer turn by turn directions, voice activated directory, etc.

The required or relevant application data 304 is dependent on the location of the device 102, which was determined by the location module 114. The data 304 is generally only available when the device 102 is within the realm 302. Based on the client access credentials, varying access permissions and applications can be available. The location can be selected from a drop down list or automated via GPS coordinates. Application data 304, such as phone contacts, are available on demand and do not have to be permanently stored in the phone, for example, a contact list. The data 304 can be available each time the network is accessed. Alternatively, persistent storage can be made available if a local data network is not provided. In one embodiment, services that are distributed are based on a more exact location determined by the location module 114. For example, if a user is within an isle of a store, all available coupons or discounts in that isle can be provided to the user through their client application 124.

The UCC client 124 on the device 102 can provide an interface to local contacts, maps, and other services. Depending on the level of device integration, these can be web-based or integrated. Integrated implies that applications 126 can update the phone contact menu, map menu, app download menu, and web browser favorites directly with localized data, allowing native device interfaces to be used to access the data 304. For example, in the phone contacts the entry "Taxi" can exist. This has a default value when the phone is in its home environment, and this number is overwritten when the phone is synchronized to another locale.

Optionally, at block 508, the device 102 can register a VoIP client. Within some embodiments, the mall can have an internal PBX system. The PBX can facilitate calls through the PSTN breakout 308. The WiFi™ telephony client can be activated from the UCC client 124 and registered to the PBX such that calls can be made. The UCC/FMC integration can allow the VoIP component of the application to associate its contact number with the local PBX so that calls originate from the location. In the case of large enterprise FMC networks, this implies dialing a "9" for a PSTN breakout 308 local to the user, not local to the user account which could be programmed on another PBX at a geographically distant location that incurs long distance charges.

At block 510, once the UCC client 124 looses synchronization with the server 200, the data 304 can be removed from the device 102. This can occur when the device 102 moves out of the realm 302 defined for the server 200. Alternatively, the user of the device 102 can stop the operation by themselves. By removing the data 304, clutter or memory usage that occurs with persistent storage can be removed from the device 102. Furthermore, the information placed within the consumer database 216 in the server 200 for the specific device 102 can be removed, for example, any IDs, IP addresses, usernames, passwords, etc. associated with the device 102. The data 304 retrieved from the server 200 generally is not relevant to other networks and locations. In one embodiment, the data 304 is only removed after a period of time such that the user can reenter the local network and the data will not be lost. The processes can end at block 512.

FIG. 6 is an exemplary system 600 for distributing localized data 602 in accordance with one or more aspects of the present disclosure. The system 600 can include the synchronization server 200, as described above, that can be coupled to a number of different components including, but not limited to, at least one transient device 102. Access can be prevented by the server 200 until proper credentials are obtained, as indicated by the lock 306. A system administrator terminal can be connected to the synchronization server 200 for providing program data 602 specific to the user's location. As differentiated from the previous system 300, this system 600 can provide more detailed data.

Continuing with the mall illustration depicted above, localized data 602 of a store within the mall can also be provided to a UCC client 124 when connected with the server 200. A PBX extension of "45678" can be stored within the location database 218. The store's corporate as well as their consumer service number can be provided by an administrator. A map of the store can be kept as a URL. In one embodiment, and to further facilitate the localized data 602, a URL can be provided that lists items within the store. A Facebook® page can be provided that can be used for advertising or the like.

The data 602 can be placed within a location database 218. The location database 218 can interact with the administrator, while the consumer database 216 can interact with the UCC client 124 on the device 102. The data 602 within the location database can include a realm 302 for the store. Contacts, maps and inventory can also be stored within the database 218. This data 602 can be accessed by the consumer database 216. The consumer database 216 can maintain IDs for each of the connected devices 102. IP addresses of the devices 102 can be stored within the consumer database 216. A PIN can also be stored within the database 216 for each connected device 102. The realm 302 for each of the connected devices 102 can also be maintained within the consumer database 216.

Turning to FIG. 7, a flow chart depicting illustrative processes for accessing a synchronization server 200 in accordance with one or more aspects of the present disclosure is provided. The processes can begin at block 700. To retrieve the localized data 602, a user of the device can launch the UCC client 124 on their device 102. In one embodiment, the client 124 can provide a "You Are Here" option on a browser operating atop the device 102. After making this selection, the client 124 on the device 102 can connect with the server 200 via the WiFi™ network or the like, and not the carrier, to pull up the mall map. A secure connection is established and a location of the device 102 is found. The location of the device 102 can be received by the synchronization server 200 at block 702. Typically, the synchronization feature can occur automatically, that is the user does not always have to initiate it. For example, the mobile device 102 can periodically report its location, or detect other WiFi™ signatures denoting other network realms 302.

Based on the location information, at block 704, the server 200 allows access to localized data 602. The data 602 can then be provided to the client 124 on the device 102 at block 706. The processes can end at block 708. Continuing with the previous illustration, the user does not see the store that they are looking for labeled on the map. The user can select "Store Directory" from the web browser, and scroll to find the store. When the user clicks on the store, the web interface provided by the mall and stored on the location database 218 can load the map and highlight the store for the user. After the user finds the store, the user requires some assistance, but no staff is visible. The user again presses the synchronization button provided by the UCC client 124.

The store does not provide an independent store network, so its localized information 602 can be contained within the mall network, for example, PBX extensions, web applications, etc. The user can access the store map and inventory stored on the location database 218 and determine which isle the item is in through the earlier provided data 602. The data 602 can be maintained within the device 102 as the user wanders through the mall. As the user exits the mall and the WiFi™ link is dropped, the UCC client 124 can clean up the contacts, favorites, and disables the WiFi™ client 124, thus restoring the phone to its original state.

From the illustration provided above, it can be seen that logical hierarchies can be created, within and outside of the mall realm 302. The carrier can provide the service, as can a mall, as can a store in the mall. Each can offer a different level of service. For example, dialing "O" on a carrier reaches a carrier operator, while dialing "O" when synchronized to the mall dials the mall operator or directory. Dialing "O" when synchronized with the store dials the store floor representative on duty. In the absence of any wireless network, a synchronization station can be used. This can be located in common areas such as building entrances. The user can manually synchronize their device 102 by placing it near the station. The synchronization station can use limited range, for example Bluetooth™/WiFi™ to populate the device 102, or some other mechanism, including a Universal Serial Bus (USB) connection.

Figure 8:
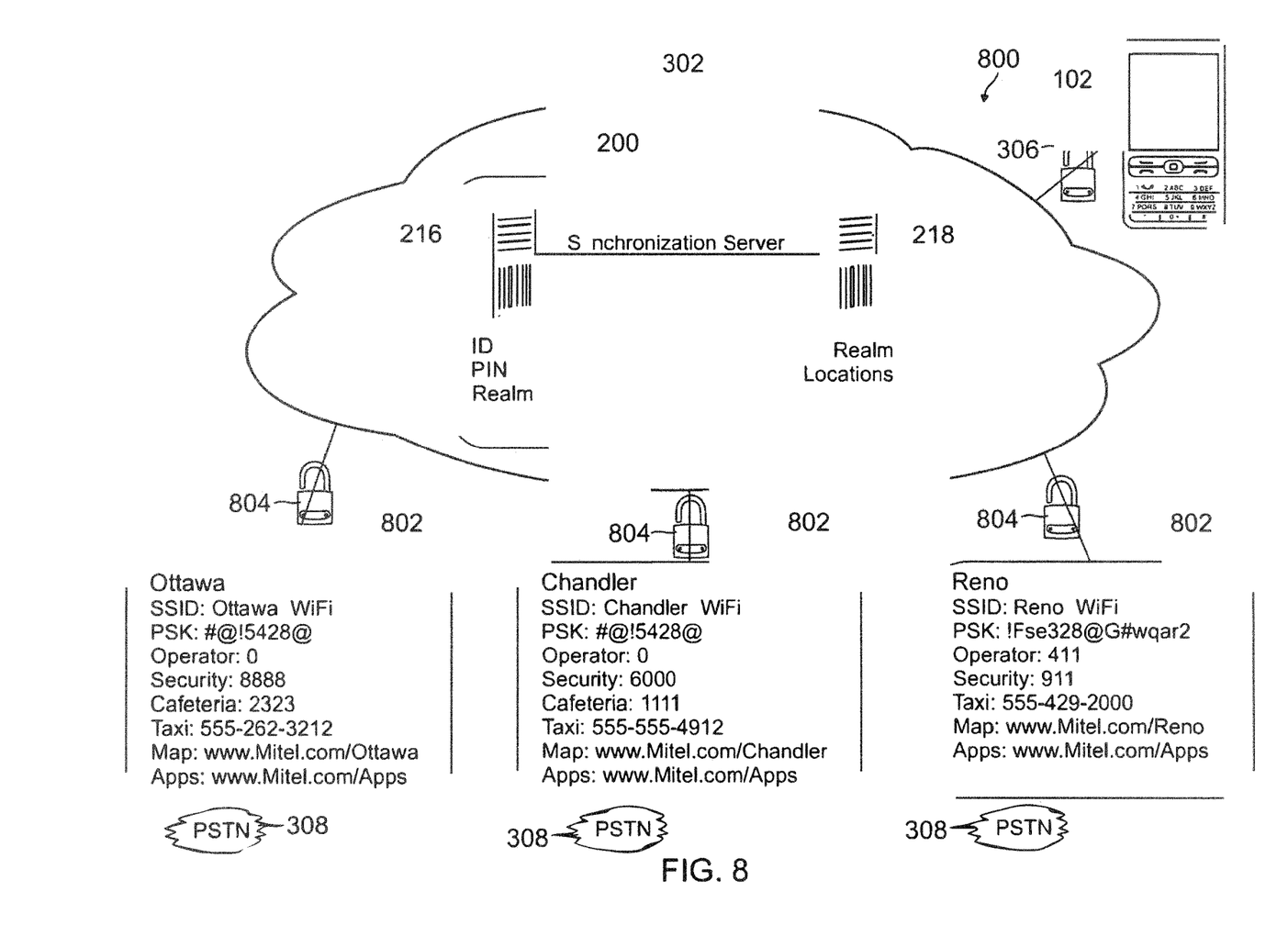
FIG. 8 is an exemplary system for localizing a device to independent wireless networks in accordance with one or more aspects of the present disclosure.

Referring to FIG. 8, an exemplary system 800 for localizing a device 102 to independent wireless networks 802 in accordance with one or more aspects of the present disclosure is provided. The system 600 can include the synchronization server 200, as described above, that can be coupled to a number of different components including, but not limited to, at least one transient device 102 and independent wireless networks 802. Access can be prevented to the UCC client 124 on the device 102 by the server 200 until proper credentials are obtained, as indicated by the lock 306. Each of the wireless networks 802 can require access credentials as shown by locks 804.

Within the synchronization server 200, the location database 218 can include the realm 302. In addition, the database 218 can maintain locations serviced by the server 200. While three different locations are shown, those skilled in the relevant art will appreciate that many more locations associated with independent wireless networks 802 can be provided such that large corporations can have numerous areas where employees work. The consumer database 216 can maintain information about connected devices 102 and their associated UCC clients 124. IDs and PINs can be stored within the database 216 for each device 102. The realm 302 covered for each device 102 can also be stored.

Localizing the networks 802 through the server 200 can provide a consistent dialing interface, for example, operator, security and taxi numbers. The UCC client 124 can also register a WiFi™ client with each network so that the user can make and receive calls locally through PSTN breakouts 308. This model is similar to that which could be employed by hotel chains. The system 800 can be provided in a cloud based environment. Contacts, maps and inventory can also be stored within the database 218. The consumer database 216 can then access this information. The consumer database 216 can maintain IDs for each of the connected devices 102. IP addresses of the devices 102 can be stored in the consumer database 216. A PIN can also be stored within the database 216 for each connected device 102. The realm 302 for each of the connected devices 102 can also be maintained.

To illustrate those features provided by the system 800, an employee who works for a company regularly travels between various corporate locations is described below. Independent wireless networks 802 exist for each location. At each of these sites, different data can exist. For example, at the Ottawa site, the SSID can be "Ottawa_WiFi" and the PSK can be "#@!5428@". To dial the operator, a "O" is entered. For security, "8888" is entered and "2323" is entered for the cafeteria. To dial a taxi, "555-262-3212" is entered. A URL can be provided for a map of the premises. Applications for the location can be found at another URL provided by the independent wireless network 802.

At another site, in Chandler, the SSID can be "Chandler WiFi" and the PSK can be "#@!5428@". The operator dial code can be "O", the security code can be "6000", the cafeteria can be "1111" and the taxi can be "555-555-4912". A URL can be provided for a map of the premises. Applications for the location can be found at another URL provided by the independent wireless network 802. At the Reno site, the independent wireless network 802 can have a SSID of "Reno_WiFi" and a PSK of "!Fse328@G #wqar2". The operator dial code can be "411", the security code can be "911" and the taxi can be "555-429-2000". A URL can be provided for a map of the premises. Applications for the location can be found at another URL provided by the independent wireless network 802. As shown, the locations can provide WiFi™ service, an operator, security, taxi and map, but it is the task of the synchronization server 200 to provide the details associated with these services based on the location of the user.

Figure 9:
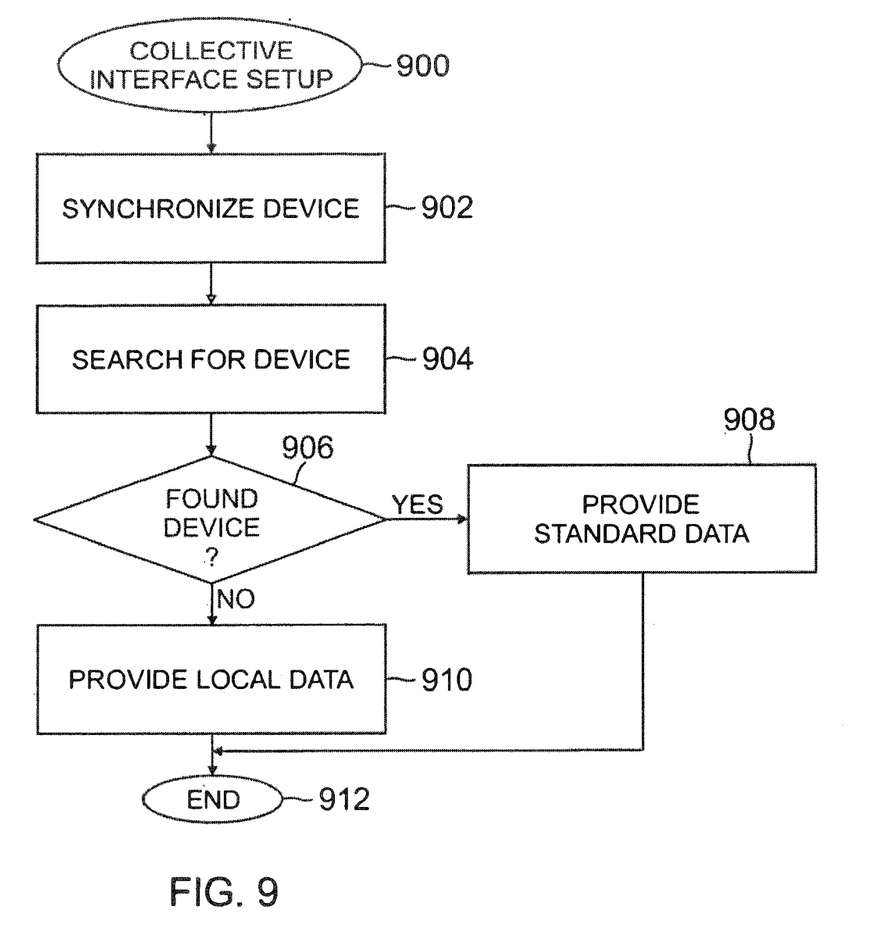
FIG. 9 is flow chart depicting illustrative processes for setting up a collective interface within many independent wireless networks in accordance with one or more aspects of the present disclosure.

FIG. 9 is flow chart depicting illustrative processes for setting up a collective interface within many independent wireless networks 802 in accordance with one or more aspects of the present disclosure. The processes can begin at block 900. The company can employ the synchronization server 200 which is used to localize the user's device 102 to each independent wireless networks 802 within the overall corporate system 800. Similar to previous examples, the user can select their location from a drop down list or this can be done automatically via a GPS location. The user of the client application 124 on the device 102 enters into any of the independent wireless networks 802. The user can synchronize their device 102 at block 902.

The wireless network 802 can then search for the device 102 at block 904. At decision block 906, a determination is made whether the device 102 is found within the consumer database 216 of the server 200. If found, a standard set of data or operations can be presented, which is typically programmed by the user, at block 908. Otherwise, local data is provided to the device 102 at block 910. For example, when the user is at the Reno site and is not found within the server 200, the user dialing "O" will not be a valid entry. If the user is found within the server 200, however, the common interface will interpret "O" to indicate that a call to the operator in Reno is required. The processes can end at block 914. Each of the independent wireless networks 802 can provide a PSTN breakout 308 to receive or make local calls.

In software implementations, computer software and/or data is stored on a machine readable medium as part of a computer program product, and is loaded into a computer system or other device or machine via a removable storage drive, hard drive, or communications interface. Computer programs, also called computer control logic or computer readable program code, are stored in a main and/or secondary memory, and executed by one or more processors, controllers, or the like to cause the one or more processors to perform the functions of the disclosure as described herein.

The figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present disclosure, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

The invention claimed is:

1. A method of providing services to a transient device comprising a client by a local network operating in a defined wireless region, the method comprising the following steps:
   providing services based on a realm by utilizing a synchronization server comprising (a) a location database, (b) realm information, and (c) a consumer database;
   using the client and a wireless interface of the transient device, connecting the transient device to the synchronization server using access credentials, wherein the connection comprises a varying level of permission, based on the access credentials, between the client and the local network;
   providing location information of the transient device to the synchronization server;
   based on the location information, providing the access credentials to location-specific data on the synchronization server to the client within the realm, wherein a level of access of the transient device is determined based on one or both of (a) a varying credential, and (b) a type of the transient device;
   determining, with a location module, that the transient device is no longer within the realm and based on the determination disconnecting the client with the local network; and
   using the client, removing the location-specific information from the transient device upon the transient device leaving the realm.

2. The method of claim 1, further comprising the step of determining the client is outside said realm for a period of time and based on the step of determining the client is outside the realm, removing the location-specific information.

3. The method of claim 1, wherein the services comprise a local breakout via a private branch exchange.

4. The method of claim 1, wherein the client or an administrator establishes the services within the realm on the local network.

5. The method of claim 1, further comprising the step of limiting access to the services through the access credentials provided to the client.

6. The method of claim 1, wherein the service that is distributed based on the location comprises a coupon or discount and the location comprises an aisle.

7. The method of claim 1 that further comprises the step of the synchronization server providing an application.

8. The method of claim 1 that further includes the step of the synchronization server providing program data to the client.

9. A method, performed by a communications device, for providing localized services on the communications device, the method comprising the following steps:
   determining a location of the communications device;
   determining that the communications device location is within a realm defined by a synchronization server;
   synchronizing the communications device with the synchronization server;
   requesting location specific data for the communications device location, wherein the location specific data is available via the synchronization server;
   receiving location specific data from the synchronization server;
   determining a more exact device location of the communications device;

the synchronization device providing one or more distributed services based on the more exact location; and removing the location specific data from the communications device in response to determining that the communications device has lost synchronization with the synchronization server.

10. The method of claim 9, wherein synchronizing the communications device with the synchronization server comprises receiving access credentials provided by the synchronization server to the communications device.

11. The method of claim 9, wherein the requesting comprises access credentials and wherein access permissions and applications for the location specific data are based on the access credentials.

12. The method of claim 9, wherein the access credentials are used to separate varying degrees of access to data, and wherein different access credentials are provided in dependence on capabilities of the communications device.

13. The method of claim 9, wherein the location specific data comprises one or more of: a web address; a map; a contact; a video; and an inventory.

14. The method of claim 9, wherein the realm is defined by one or more wireless network access points.

15. The method of claim 9 that further comprises the step of providing the communications device with access to a PSTN breakout via a local network on which the synchronization server is located and based on the device location.

16. A system to perform the method of claim 1.

17. The system of claim 16, comprising the transient device, wherein the transient device comprises:
a wireless interface;
at least one processor; and
a memory operatively coupled to the at least one processor, the memory being configured to store program instructions that when executed by the at least one processor, causes the at least one processor to perform the steps of:
connecting the transient device to the synchronization server using the access credentials, the connection comprising one of the varying level of permissions, based on the access credentials, between the transient device and the local network;
establishing the secure connection with the local network;
providing location information of the transient device to the synchronization server;
receiving the access credentials to the location specific data from the synchronization server;
determining, with a location module, that the transient device is no longer within the realm and based on the determination disconnecting the transient device with the local network; and
the client removing the location-specific information from the transient device upon the transient device leaving the realm.

18. The system of claim 17, further comprising the synchronization server.

19. The system of claim 17, wherein the synchronization server comprises program data, and wherein the program data is provided by the synchronization server to the transient device.

* * * * *